(12) United States Patent
Martin et al.

(10) Patent No.: US 10,698,593 B1
(45) Date of Patent: Jun. 30, 2020

(54) SYMMETRIC LOG AXIS SCALING FOR A DATA VISUALIZATION USER INTERFACE

(71) Applicant: Tableau Software, Inc., Seattle, WA (US)

(72) Inventors: Tyler Martin, Seattle, WA (US); Jeannine Frazier Boone, Kenmore, WA (US); Bora Beran, Bothell, WA (US)

(73) Assignee: Tableau Software, Inc., Seattle, WA (US)

( * ) Notice: Subject to any disclaimer, the term of this patent is extended or adjusted under 35 U.S.C. 154(b) by 101 days.

(21) Appl. No.: 16/154,649

(22) Filed: Oct. 8, 2018

(51) Int. Cl.
| | |
|---|---|
| *G06F 3/0484* | (2013.01) |
| *G06F 16/2455* | (2019.01) |
| *G06F 3/0482* | (2013.01) |
| *G06F 16/25* | (2019.01) |
| *G06F 16/248* | (2019.01) |

(52) U.S. Cl.
CPC ........ *G06F 3/04847* (2013.01); *G06F 3/0482* (2013.01); *G06F 16/248* (2019.01); *G06F 16/2455* (2019.01); *G06F 16/252* (2019.01)

(58) Field of Classification Search
CPC .................................................. G06F 3/04847
USPC .......................................................... 715/781
See application file for complete search history.

(56) References Cited

U.S. PATENT DOCUMENTS

| | | | | |
|---|---|---|---|---|
| 8,065,044 B2* | 11/2011 | Jump | ..................... | G05D 1/101 |
| | | | | 244/180 |
| 8,229,678 B2* | 7/2012 | Lu | .................... | G01N 35/00871 |
| | | | | 702/21 |
| 9,132,219 B2* | 9/2015 | Akonur | .................... | A61M 1/16 |
| 9,761,026 B1* | 9/2017 | Barabas | ................ | G06T 11/206 |
| 10,168,990 B1* | 1/2019 | Annamalai | ............... | G06F 8/51 |
| 2004/0143423 A1* | 7/2004 | Parks | ..................... | G16B 45/00 |
| | | | | 702/194 |
| 2013/0285968 A1* | 10/2013 | Christiansson | ....... | G06F 3/0416 |
| | | | | 345/173 |
| 2014/0292701 A1* | 10/2014 | Christiansson | ....... | G06F 3/0421 |
| | | | | 345/173 |

(Continued)

OTHER PUBLICATIONS

Rick Wicklin, "Scatter plots with logarithmic axes . . . and how to handle zeros in the data" available online at [https://blogs.sas.com/content/iml/2014/07/09/scatter-plots-with-log-axes.html], published on Jul. 9, 2014 (Year: 2014).*

*Primary Examiner* — Reza Nabi (74) *Attorney, Agent, or Firm* — Morgan, Lewis & Bockius LLP (57) ABSTRACT

A process displays a data visualization user interface on a computing device. Using the user interface, a user selects a data set and a set of configuration parameters. The parameters selected include (i) a first data field from the data set to define a first axis of a two-dimensional data visualization and (ii) a second data field to define a second axis of the data visualization. When the user selects the first axis, the interface displays an axis configuration window. The user selects the symmetric log axis scaling option for the first axis. The device retrieves the data set from a database according to the configuration parameters. The device then generates and displays the data visualization according to the configuration parameters, including scaling the first axis of the data visualization using a symmetric log transformation function and displaying axis tick marks on the first axis according to the scaling.

20 Claims, 10 Drawing Sheets

Axis Transform Functions (56) References Cited

U.S. PATENT DOCUMENTS

2015/0331963 A1* 11/2015 Barker ............... G06F 3/04812
                                                        706/11
2019/0097587 A1*  3/2019 Vasan ................. H03F 1/3205
2019/0178980 A1*  6/2019 Zhang ................ A61B 5/7257
2019/0294137 A1*  9/2019 Kawanoue ............ G05B 19/05

* cited by examiner

618 — Generate and display the data visualization according to the configuration parameters, including scaling the first axis of the data visualization using a symmetric log transformation function and displaying axis tick marks on the first axis according to the scaling.

620 — The symmetric log transformation function is an inverse hyperbolic sine function $asinh(x) = ln(x + \sqrt{x^2 + 1})$.

622 — The symmetric log transformation function is $\log_{10}(x)$ when x > 0 and $-\log_{10}(-x)$ when x < 0.

624 — Compute a range of values (min, max) for data values of the first data field in the retrieved data set, and display axis tick marks on the first axis in accordance with the computed range.

626 — Determine that min > 0. Based on this determination:
(i) compute a least integer m for which $10^m \geq$ min;
(ii) compute a least integer n for which $10^n \geq$ max; and
(iii) display axis tick marks corresponding to $10^m, 10^{m+1}, ...,$ and $10^n$.

628 — Determine that max < 0. Based on this determination:
(i) compute a least integer m for which $10^m \geq$ -max;
(ii) compute a least integer n for which $10^n \geq$ -min; and
(iii) display axis tick marks corresponding to $-10^m, -10^{m+1}, ...,$ and $-10^n$.

630 — Determine that min = 0. Based on this determination:
(i) compute a least integer m for which $10^n \geq$ max;
(ii) compute a minimum value m = minimum (0, n − 1); and
(iii) display axis tick marks corresponding to $10^m, 10^{m+1}, ...,$ and $10^n$.

Figure 6B

- 618 — Generate and display the data visualization according to the configuration parameters, including scaling the first axis of the data visualization using a symmetric log transformation function and displaying axis tick marks on the first axis according to the scaling (continued).

- 622 — The symmetric log transformation function is $\log_{10}(x)$ when $x > 0$ and $-\log_{10}(-x)$ when $x < 0$ (continued).

- 624 — Compute a range of values (min, max) for data values of the first data field in the retrieved data set, and display axis tick marks in accordance with the computed range (continued).

- 632 — Determine that max = 0. Based on this determination:
  (i) compute a least integer s for which $10^s \geq -\text{min}$;
  (ii) compute a minimum value $r = \text{minimum}(0, s - 1)$; and
  (iii) display axis tick marks corresponding to $10^r, 10^{r+1}, \ldots,$ and $10^s$.

- 634 — Determine that min < 0 and max > 0. Based on this determination:
  (i) compute a least integer n for which $10^n \geq \text{max}$;
  (ii) compute a value $m = \text{minimum}(0, n - 1)$;
  (iii) display positive axis tick marks corresponding to $10^m, 10^{m+1}, \ldots, 10^n$;
  (iv) compute a least integer s for which $10^s \geq -\text{min}$;
  (v) compute a value $r = \text{minimum}(0, s - 1)$; and
  (vi) display negative axis tick marks corresponding to $-10^r, -10^{r+1}, \ldots,$ and $-10^s$.

- 636 — Determine that min < 0 and max > 0. Based on this determination:
  (i) compute a least integer n for which $10^n \geq \text{max}$;
  (ii) compute a value $m = \text{minimum}(0, n - 1)$;
  (iii) compute a least integer s for which $10^s \geq -\text{min}$;
  (iv) compute a value $r = \text{minimum}(0, s - 1)$;
  (v) select k as the minimum of m and r;
  (vi) display positive axis tick marks corresponding to $10^k, 10^{k+1}, \ldots,$ and $10^n$ and display negative axis tick marks corresponding to $-10^k, -10^{k+1}, \ldots,$ and $-10^s$.

SYMMETRIC LOG AXIS SCALING FOR A DATA VISUALIZATION USER INTERFACE

TECHNICAL FIELD

The disclosed implementations relate generally to data visualization and more specifically to systems, methods, and user interfaces that visualize data using one or more axes that have symmetric logarithmic scaling.

BACKGROUND

Data visualization applications enable a user to understand a data set visually, including distribution, trends, outliers, and other factors that are important to making business decisions. However, different data sets from different data sources can have unique characteristics (e.g., data distributions), and sometimes characteristics of data sets from the same data source can vary over time. Some data sets have data values over a wide range (e.g., multiple orders of magnitude). When all of the data in the range is positive, an axis of a data visualization can use a logarithmic scale. However, a logarithmic scale does not work when the range of data values includes 0 or negative values.

SUMMARY

Accordingly, some implementations of a data visualization application include a symmetric log axis scaling transformation, which produces a logarithmic scale, but modified to handle data value ranges that include 0 and/or negative values. Depending on the data, a user can choose data visualization axes that have no scaling, standard logarithmic scaling, or symmetric logarithmic scaling.

In accordance with some implementations, a method of displaying data in data visualizations is performed at a computer system having one or more processors and memory. The memory stores one or more programs configured for execution by the one or more processors. The computer system displays a data visualization user interface. The computer system receives user selection, in the user interface, of a data set and a set of configuration parameters. The set of configuration parameters include selection of (i) a first data field from the data set to define a first axis of a two-dimensional data visualization and selection of (ii) a second data field from the data set to define a second axis of the data visualization. When a user selects the first axis, the user interface displays an axis configuration window, which defaults to no axis scaling for the first axis. In some instances, a user selects the symmetric log axis scaling option for the first axis, according to user input in the axis configuration window. The computer system retrieves the data set from a database in accordance with the set of configuration parameters (e.g., by generating and executing database queries). The computer system then generates and displays the data visualization according to the configuration parameters. This includes scaling the first axis of the data visualization using a symmetric log transformation function and displaying axis tick marks on the first axis according to the scaling.

In some implementations, the symmetric log transformation function is an inverse hyperbolic sine function a sin $h(x)=\ln(\sqrt{x^2+1})$.

In some implementations, the symmetric log transformation function is $\log_{10}(x)$ when $x>0$ and $-\log_{10}(-x)$ when $x<0$. In some implementations, generating and displaying the data visualization includes computing a range of values (e.g., from a low value of "min" to a high value of "max") for data values of the first data field in the retrieved data set. The computer system displays axis tick marks on the first axis in accordance with the computed range.

In some instances, generating and displaying the data visualization further includes: (i) determining that min>0; (ii) computing a least integer m for which $10^m \geq \text{min}$; (iii) computing a least integer n for which $10^n \geq \text{max}$; and (iv) displaying axis tick marks corresponding to $10^m$, $10^{m+1}$, ..., and $10^n$.

In some instances, generating and displaying the data visualization further includes: (i) determining that max<0; (ii) computing a least integer m for which $10^m \geq -\text{max}$; (iii) computing a least integer n for which $10^n \geq -\text{min}$; and (iv) displaying axis tick marks corresponding to $-10^m$, $-10^{m+1}$, ..., and $-10^n$.

In some instances, generating and displaying the data visualization further includes: (i) determining that min=0; (ii) computing a least integer n for which $10^n \geq \text{max}$; (iii) computing a value m=minimum (0, n-1); and (iv) displaying axis tick marks corresponding to $10^m$, $10^{m+1}$, ..., and $10^n$.

In some instances, generating and displaying the data visualization further includes: (i) determining that max=0; (ii) computing a least integer s for which $10^s \geq -\text{min}$; (iii) computing a value r=minimum (0, s-1); and (iv) displaying axis tick marks corresponding to $-10^r$, $-10^{r+1}$, ..., and $-10^s$.

In some instances, generating and displaying the data visualization further includes: (i) determining that min<0 and max>0; (ii) computing a least integer n for which $10^n \geq \text{max}$; (iii) computing a value m=minimum (0, n-1); (iv) displaying positive axis tick marks corresponding to $10^m$, $10^{m+1}$, ..., and $10^n$; (v) computing a least integer s for which $10^s \geq -\text{min}$; (vi) computing a value r=minimum (0, s-1); and (vii) displaying negative axis tick marks corresponding to $-10^r$, $-10^{r+1}$, ..., and $-10^s$.

In some instances, generating and displaying the data visualization further includes: (i) determining that min<0 and max>0; (ii) computing a least integer n for which $10^n \geq \text{max}$; (iii) computing a value m=minimum (0, n-1); (iv) computing a least integer s for which $10^s \geq -\text{min}$; (v) computing a value r=minimum (0, s-1); (vi) selecting k as the minimum of m and r; (vii) displaying positive axis tick marks corresponding to $-10^k$, $10^{k+1}$, ..., and $10^n$; and (viii) displaying negative axis tick marks corresponding to $-10^k$, $-10^{k+1}$, ..., and $-10^s$.

In some implementations, a computer device includes one or more processors, memory, and one or more programs stored in the memory. The programs are configured for execution by the one or more processors. The one or more programs include instructions for performing any of the methods described herein.

In some implementations, a non-transitory computer readable storage medium stores one or more programs configured for execution by a computer device having one or more processors and memory. The one or more programs include instructions for performing any of the methods described herein.

Thus methods, systems, and graphical user interfaces are disclosed that enable data visualization adaptively based on a logarithmic scale.

BRIEF DESCRIPTION OF THE DRAWINGS

For a better understanding of the aforementioned systems, methods, and graphical user interfaces, as well as additional systems, methods, and graphical user interfaces that provide data visualization axis scaling, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
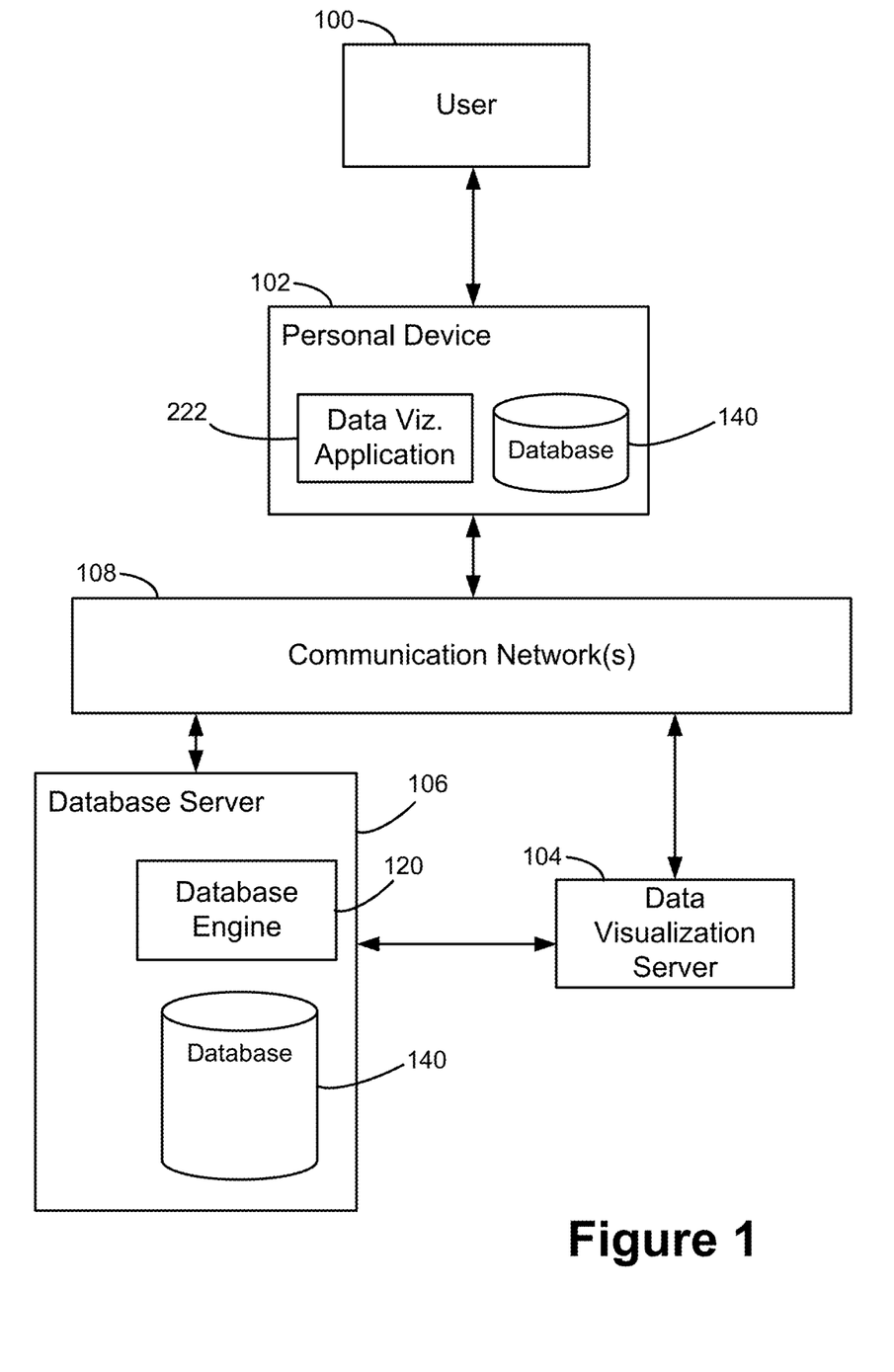
FIG. 1 illustrates a data visualization environment in which data visualizations are generated according to user-selected configuration parameters, in accordance with some implementations.

FIG. 1 illustrates a data visualization environment in which data is visualized according to configuration parameters selected by a user. A user 100 interacts with a personal device 102, such as a desktop computer, a laptop computer, a tablet computer, a mobile smartphone, or a mobile computer system. A personal device 102 is an example of a computer system 200. The term "computer system" also includes server computers, which may be significantly more powerful than a personal device used by a single user, and are generally accessed by a user indirectly via a personal device. An example computer system 200 is described below with respect to FIG. 2, including various software programs or modules that execute on the device 200. In some implementations, the personal device 102 includes one or more desktop data sources (e.g., CSV files or spreadsheet files). In some implementations, the personal device 102 includes a database engine 120, which provides access to one or more relational databases 140 (e.g., SQL databases). Data stored in the relational databases 140 of the personal device 102 is retrieved in accordance with database queries received by the database engine 120. In some implementations, the personal device 102 includes a data visualization application 222, which the user 100 uses to create data visualizations from the desktop data sources and/or the relational databases 140. For example, the data visualization application 222 of the personal device 102 generates a database query for a data visualization, and sends the database query to the database engine 120. The database engine 120 then retrieves data stored in the database 140 in response to the database query. Upon receiving the retrieved data from the database engine 120, the data visualization application 222 visualizes the retrieved data locally, thereby enabling the user 100 to visualize the data that is stored locally on the personal device 102.

In some implementations, the personal device 102 connects to one or more external database servers 106 and/or a data visualization server 104. Each of the one or more database servers 106 includes a database engine 120 configured to access one or more databases 140 that are stored at the respective database server 106. In some implementations, the data visualization server 104 includes a database engine 120 and one or more databases 140, and the database engine 120 is configured to access one or more databases 140 of the data visualization server 104.

In some implementations, data visualization functionality is implemented only by the data visualization application 222 of the personal device 102 locally. In some implementations, the data visualization functionality is provided collectively by the local data visualization application 222 and the remote data visualization server 104, particularly when corresponding data retrieval or visualization involves resource intensive operations that are preferably implemented at a specialized server. In this situation, the user 100 may build a data visualization using the local application 222 of the personal device 102. One or more requests are received via the data visualization interface of the application 222 and sent to the data visualization server 104 to generate data visualization results.

In some implementations, data is provided by a live data stream and visualized in the data visualization application 222 of the personal device 102 and/or the data visualization server 104. Earlier data items of the data stream are retrieved from the database 140 of the personal device 102 or the database server 106, and visualized in the personal device 102 or the data visualization server, concurrently while subsequent data items of the data stream are generated and stored into the databases 140 of the personal device 102 and/or the database server. In some situations, the data items in the live data stream are not stored into the database 140 prior to visualization. Rather, the data items in the data stream are cached in a cache of the personal device 102 or the data visualization server 104. The earlier data items of the data stream are retrieved from the cache and visualized by the personal device 102 or the data visualization server 104, concurrently while the subsequent data items of the data stream are generated and stored into the cache. Data items in the live data stream are generated and provided by the personal device 102, the data visualization server 104, other client devices that are communicatively coupled to the personal device 102 and the data visualization server 104 via one or more communication network (wired or wireless), or any combination thereof.

In some implementations, the personal device 102 connects to the external database servers 106 and/or the data visualization server 104 over one or more communications networks 108. The communication networks 108 can include one or more network topologies, including the Internet, intranets, local area networks (LANs), cellular networks, Ethernet, Storage Area Networks (SANs), telephone networks, Bluetooth personal area networks (PAN), and the like. In some implementations, the data visualization server 104 provides a data visualization web application that runs within a web browser 220 on the personal device 102.

In accordance with some implementations, a computer system (e.g., the personal device 102 or the data visualization server 104) displays a data visualization user interface 224 for a user 100. The user selects one or more data sources for a data visualization and defines various configuration parameters for the data visualization. Some of the configuration parameters are set by assigning one or more data fields from the data source. For example, the x and y position of visual marks can be specified according to data fields placed onto the columns shelf 320 and rows shelf 322 in the user interface. The user can also use an axis configuration window 500 to specify how the axes of the data visualization are displayed. Based on the user-selected configuration parameters, the data visualization application 222 displays a data visualization, including axes that may be scaled according to a logarithmic scaling or a symmetric logarithmic scaling.

Figure 2:
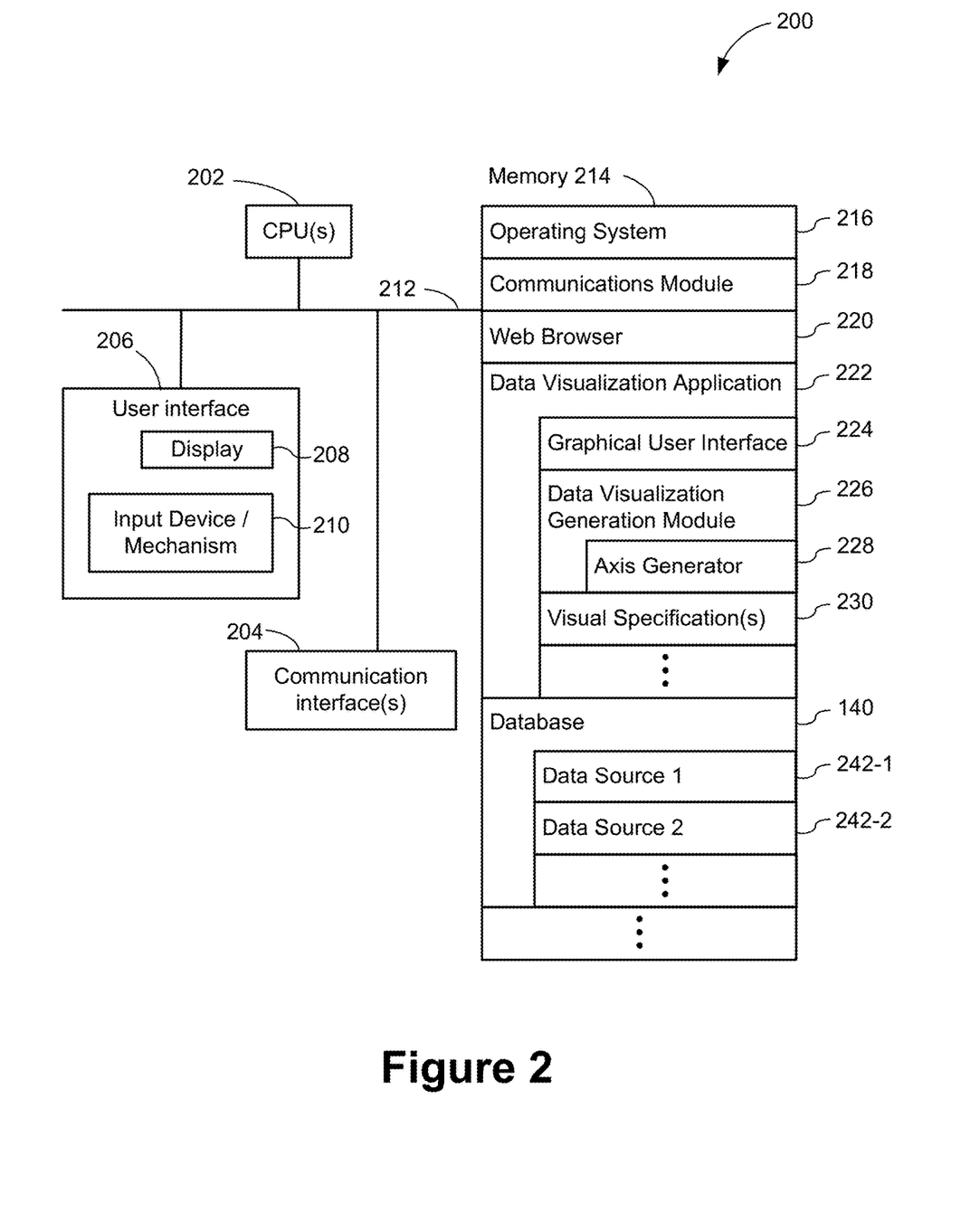
FIG. 2 is a block diagram illustrating a computer device (e.g., a personal device) that can display a graphical user interface in accordance with some implementations.

FIG. 2 is a block diagram illustrating a computer device 200 (e.g., a personal device 102) that can display a graphical user interface in accordance with some implementations. Various examples of the computer device 200 include a desktop computer, a laptop computer, a tablet computer, and other computer devices that have a display and a processor capable of running a data visualization application 222. The computer device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computer device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computer device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 224 for a user to construct visual graphics. For example, a user selects one or more data sources 242 (which may be stored on the computer device 200 or stored remotely in a database server 106), selects data fields from the data source(s), and uses the selected fields to define a visual graphic. In some implementations, the information the user provides is stored as a visual specification 230. The data visualization application 222 includes a data visualization generation module 226, which takes the user input (e.g., the visual specification 230), and generates a corresponding visual graphic (also referred to as a "data visualization" or a "data viz"). The application 222 also includes an axis generator 228, which generates appropriate axes for the data visualization according to the user-selected configuration (e.g., using no axis scaling, logarithmic scaling, or symmetric logarithmic scaling). The data visualization application 222 then displays the generated visual graphic, including the visualization axes, in the user interface. In some implementations, the data visualization application 222 executes as a standalone application (e.g., a desktop application). In some implementations, the data visualization application 222 executes within the web browser 220 or another application using web pages provided by a web server (e.g., a data visualization server 104); and
- zero or more databases 140 (e.g., storing a first data source 242-1 and a second data source 242-2), which are used by the data visualization application 222. In some implementations, the data sources are stored as spreadsheet files, CSV files, XML files, or flat files, or stored in a relational database.

In some implementations, the visual specifications 230 include axis scale settings, including selection from a plurality of scaling options so specify whether to use a logarithmic scale or a symmetric logarithmic scale.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computer device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
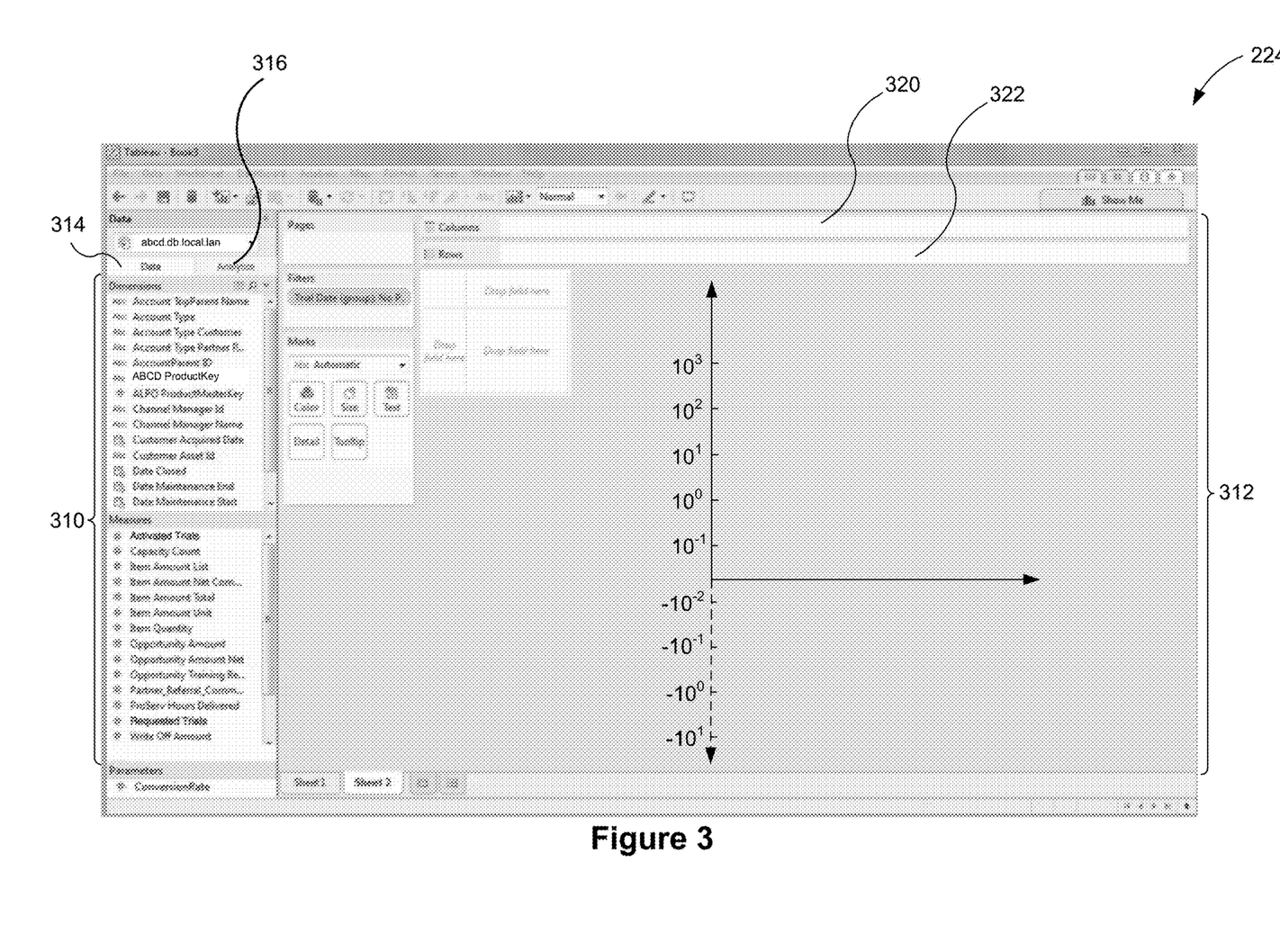
FIG. 3 illustrates a graphical user interface for interactive data analysis in accordance with some implementations.

FIG. 3 illustrates a graphical user interface 224 for interactive data analysis in accordance with some implementations. The user interface 224 includes a Data tab 314 and an Analytics tab 316 in accordance with some implementations. When the Data tab 314 is selected, the user interface 300 displays a schema information region 310, which is also referred to as a data pane. The schema information region 310 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 316 is selected, the user interface 224 displays a list of analytic functions instead of data elements (not shown).

The graphical user interface 224 also includes a data visualization region 312. The data visualization region 312 includes a plurality of shelf regions, such as a columns shelf region 320 and a rows shelf region 322, which determine horizontal and vertical placement of visual marks for a data visualization. These are also referred to as the column shelf 320 and the row shelf 322. As illustrated here, the data visualization region 312 also has a large space for displaying a visual graphic. Because no data elements have been selected yet, the space initially has no visual graphic. In some implementations, the data visualization region 312 has multiple layers that are referred to as sheets.

In an example, a scatter chart is displayed in the data visualization region 312, with a y-axis of the scatter chart correspond to a first data field. The y-axis is displayed according to a symmetric logarithmic scale. As a result, a plurality of tick marks are evenly distributed on the positive y-axis to represent different orders of magnitude (e.g., 0.1, 1, 10, 100, and 1000). Also, the negative y-axis represents orders of magnitude for negative values.

Figure 4:
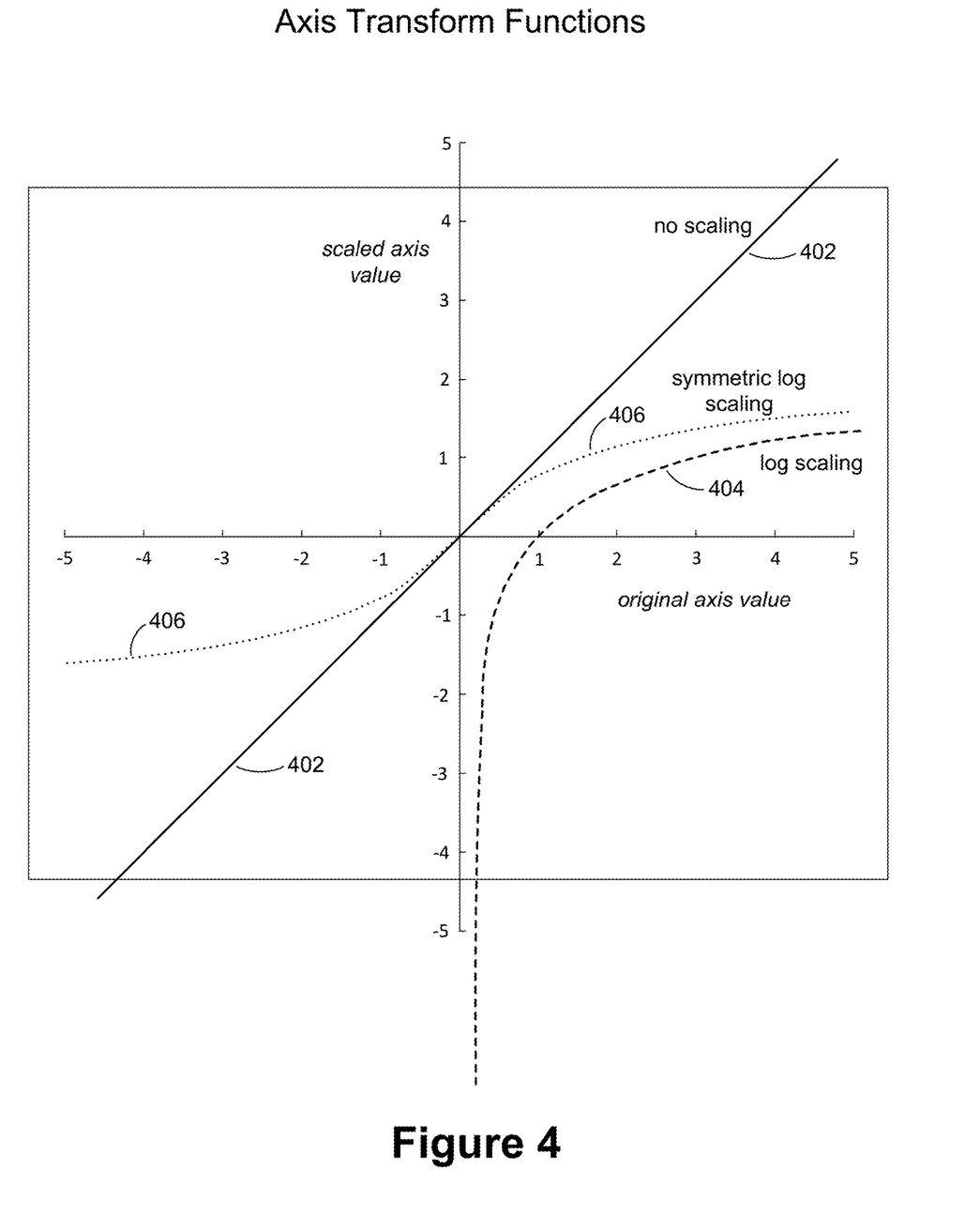
FIG. 4 illustrates three types of axis scaling in accordance with some implementations.

FIG. 4 illustrates three types of axis scaling that can be used for data visualization axes. The first example is no scaling (402). The data values are not scaled at all. The second example is logarithmic scaling 404. In this case, a logarithmic transform is applied to values on the axis. As illustrated in FIG. 4, logarithmic scaling only works when the data values are positive. The third example is symmetric log scaling 406. In some implementations, an inverse hyperbolic sine a sin $h(x)=\ln(x+\sqrt{x^2+1})$ is used for symmetric log axis scaling. Note that for large data values x>>0, a sin $h(x) \approx \ln(x)$. For large negative data values x<<0, a sin $h(x) \approx -\log(|x|)$. For values of x close to 0, a sin $h(x) \approx x$. This is illustrated in FIG. 4, where the symmetric log scaling graph closely matches the "no scaling" graph 402 near the origin, and approaches the "log scaling" graph 404 moving to the right.

A symmetric logarithmic scale can be applied when the range of data values includes 0 or negative values. This doubles the range of data values that can be visualized using a logarithmic scale.

Table 1 compares a linear scale, a logarithmic scale, and a symmetric logarithmic scale. Logarithmic scaling allows a user to view a set of data values that has a heavily skewed distribution, but negative data values cannot be visualized with a typical logarithm axis. In some situations, a logarithmic scale is selected for visualizing a data set consisting of small positive data values (0<x<<1). In some situations, a logarithmic scale is selected for visualizing large positive data values (x>>1). In some situations, the symmetric logarithmic scale is selected for visualizing data having both large positive data values and large negative data values ($|x|$>>1). The symmetric log axis scale can also be used when the domain of data values includes zero.

TABLE 1

Comparison of a linear scale, a logarithmic scale, and a symmetric logarithmic scale

|  | Quantitative (Linear) Scale | Logarithmic Scale | Symmetric Logarithmic Scale |
| --- | --- | --- | --- |
| Transform | x | ln(x) | asinh(x) |
| Do negative values appear? | yes | no | yes |
| Does zero appear on the axis? | yes | no | yes |
| Do positive values appear? | yes | yes | yes |
| Good for visualizing the scale of small positive values (x << 1)? | no | yes | no |
| Good for visualizing the scale of large positive values (x >> 1)? | no | yes | yes |
| Good for visualizing the scale of large ($|x|$ >> 1) positive and negative values together? | no | no | yes |
| Good for visualizing the scale of small ($|x|$ << 1) positive and negative values together? | no | no | no |

Figure 5:
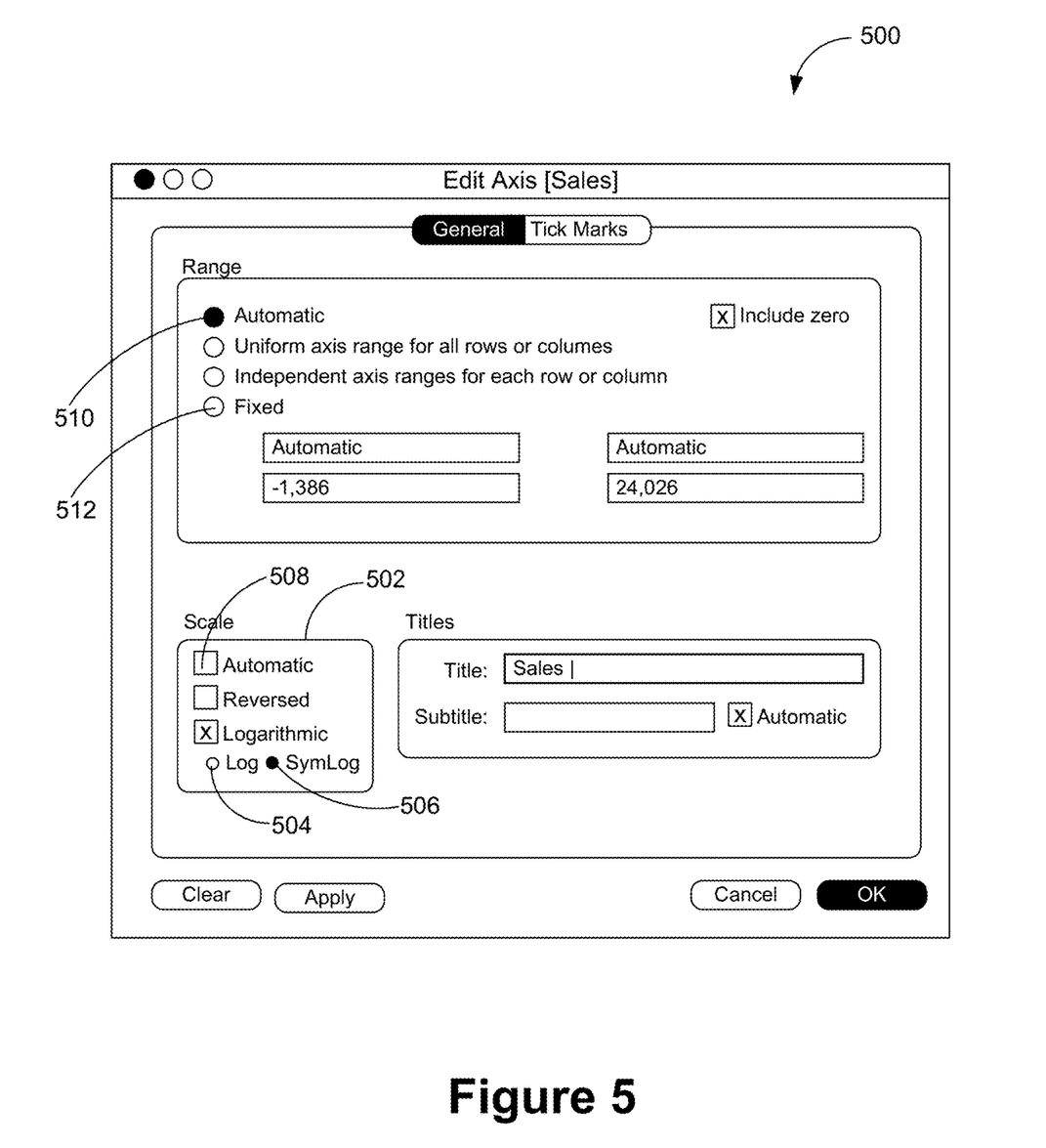
FIG. 5 illustrates an axis configuration window, which is presented in a graphical user interface 224 for defining axis characteristics for a data visualization, in accordance with some implementations.

FIG. 5 illustrates a configuration window 500 that is presented in a graphical user interface 224 for defining an axis of a visual graphic. The configuration window 500 includes a scale region 502 configured to define axis scaling settings by receiving a user selection of one of a plurality of scaling options. The plurality of scaling options includes a logarithmic scale. The logarithmic scales include a standard logarithmic scale 504 and a symmetric logarithmic scale 506. The selected scale applies to all data values for the selected axis. In some implementations, when the logarithmic scale 504 is selected and the set of data values includes zero or a negative data value, an error message is displayed in the graphical user interface 224 indicating that the selected logarithmic scale 504 cannot be applied to some data values.

The plurality of scaling options further include an automatic scale 508. User selection of the automatic scale 508 enables automatic scaling of the data values according to one of a linear scale, a logarithmic scale, or a symmetric logarithmic scale depending on the distribution of data values. Specifically, in some situations, in accordance with the user selection of the automatic scale 508, the computer system 200 determines that the set of data values satisfies a logarithmic scale criterion (e.g., as shown in Table 1). When it is determined that all of the data values are positive and cover a wide range, some implementations automatically select the logarithmic scale. Alternatively, when it is determined that the set of data values covers a wide range and includes either zero or negative values, the symmetric logarithmic scale is automatically selected.

The user selection of a scaling option also determines where to place tick marks on the axis and what mark values are placed on an axis. In accordance with a linear scale, the tick marks correspond to real numbers without any scaling. In accordance with a logarithmic scale, the tick marks correspond to positive real numbers that are scaled using a logarithmic function. For example, the tick marks are evenly distributed on the axis and correspond to 0.01, 0.1, 1, 10, and 100, which are scaled using a base 10 logarithmic function. In accordance with a the symmetric logarithmic scale, the positive and negative tick marks correspond to positive and negative real numbers that are scaled using an inverse hyperbolic sine function.

In some implementations, the configuration window 500 is configured to define properties of an axis (e.g., range settings of the axis), and includes a plurality of range options for defining a range of the axis. The plurality of range options includes at least the automatic range definition option 510 and a fixed range definition option 512. In accordance with the automatic range definition option 510, a user does not need to define a maximum value or a minimum value for the axis corresponding to the data values. They are automatically determined and updated based on the set of data values that are visualized. In accordance with the fixed range definition option 512, a user can enter a maximum value and a minimum value for the axis corresponding to the data values. If a data value is outside the user-defined maximum and minimum values, the data value is not displayed in the generated data visualization.

In some implementations for a logarithmic scale or a symmetric logarithmic scale, a positive maximum data value and a positive minimum data value are identified for a data field. A first major exponent is identified based on the positive minimum value (e.g., the least exponent with $10^m \geq$ the minimum value or $\log_{10}$(minimum value), rounded to the closest integer) and used as a minimum value for the tick marks on the axis. The tick marks step up in powers of 10 from the first major exponent until they pass the positive maximum value (e.g., up to $10^n$, where n is the least integer with $10^n \geq$ maximum value). The positive maximum data value and minimum data values are scaled using the base 10 logarithmic scale. In some implementations, the scaled maximum and minimum data values are rounded up or down to the closest integers.

In an example, the maximum and minimum data values of a data field are 100580 and 0.15. The first major exponent is identified as $10^{-1}$ based on the minimum data value of 0.15. The tick marks start at $10^{-1}$ and step by in powers of 10 until it reaches $10^6$, which passes the maximum data value of 100580. In this example, the maximum data value (100580) is scaled and rounded up to $10^6$, whereas the minimum data value (0.15) is scaled and rounded down to $10^{-1}$. The minimum value and maximum value of the tick marks are defined as $10^{-1}$ and $10^6$, respectively.

When a symmetric logarithmic scale is used, a tick mark range is determined based on whether the axis corresponding to the set of data values includes zero, is entirely negative, or is entirely positive. In accordance with a determination that the axis is entirely positive, a positive maximum data value and a positive minimum data value are identified in the set of data values. As explained above, the first major exponent is identified based on the minimum value and used as a minimum value for the tick marks of the axis. The tick marks step up in powers of 10 from the first major exponent until they pass the maximum value. When the axis is entirely negative, a negative maximum data value (e.g., −0.15) and a negative minimum data value (e.g., −100580) are identified in the set of data values. The first major exponent (e.g., $-10^{-6}$) is identified based on the negative minimum value and used as a minimum value for the tick marks of the axis. The tick marks step up in powers of 10 from the first major exponent until they pass the negative maximum value (e.g., reach $-10^{-1}$).

In accordance with a determination that the axis includes both negative and positive data values, the axis is partitioned into two ranges that includes a positive range and a negative range for the purposes of presenting the positive and negative data values. For the negative range, a negative minimum data value is identified in the negative data values, and a first major exponent is identified based on the negative minimum data value and used as a minimum negative value for the tick marks of the axis. The tick marks step up in powers of 10 from the first major exponent until tick marks passes a negative maximum data value. For the positive range, a positive minimum data value is identified, and a second major exponent is identified based on the positive minimum data value and used as a minimum positive value for the tick marks of the axis. The tick marks step up in powers of 10 from the second major exponent until tick marks passes the positive maximum data value of the data values.

In some implementations, the set of data values include zero, so the tick marks also include zero. Consider first the case where the minimum value of the data field for the axis is zero (and the maximum value is positive). In this case, there is no positive minimum value to establish a starting point for the tick marks, so the process works backwards from the maximum value. First, compute the last major exponent (e.g., the least value of n for which $10^n \geq$ max value or else $\log_{10}$(max value), rounded to the nearest integer). If n<1, start the positive axis ticks at $10^m$, where m=n−1. Otherwise, start the axis ticks at 1 (=$10^0$). Equivalently, start the axis ticks at $10^m$, where m is the min(0, n−1).

In the case where the maximum value is 0, the process is essentially the same as the positive case. That is, find the last major exponent s (e.g., the least value of s for which $10^s \geq$ −(max value) or else $-\log_{10}$(−(min value)), rounded to the nearest integer). Then compute r as min(0, s−1). The tick marks on the negative axis correspond to $-10^r, -10^{r+1}, \ldots$ , and $-10^s$.

When the data value range for the data field corresponding to the axis spans zero (i.e., min value<0<max value), the process is split into the positive and negative cases as just described. In some implementations, the positive and negative axis tick marks are determined and displayed independently of each other. However, some implementations combine the low values (lowest in absolute value) of the two ranges. That is, if m, n, r, and s are computed as above, then compute a value k=min(m, r). In this case, the positive tick marks are $10^k, 10^{k+1}, \ldots$, and $10^n$, and the negative tick marks are $-10^k, -10^{k+1}, \ldots$, and $-10^s$.

In some instances, a user specifies an origin for the axis, in which case that is used as the starting point for the tick marks if that would include more tick marks than the method described above.

Figure 6A:
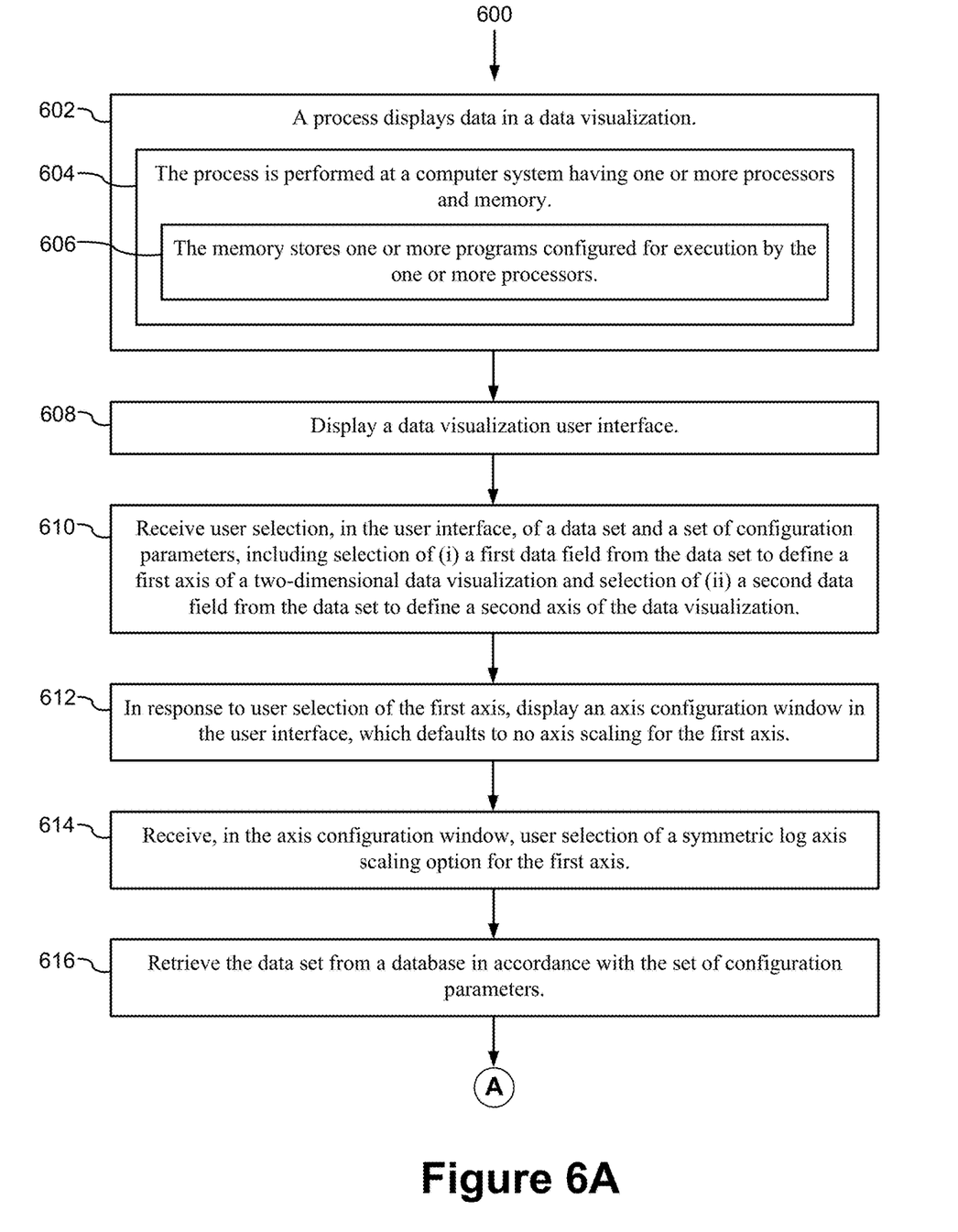
FIGS. 6A-6C provide a flowchart of a process for visualizing a data set in accordance with some implementations.
Figure 6B:
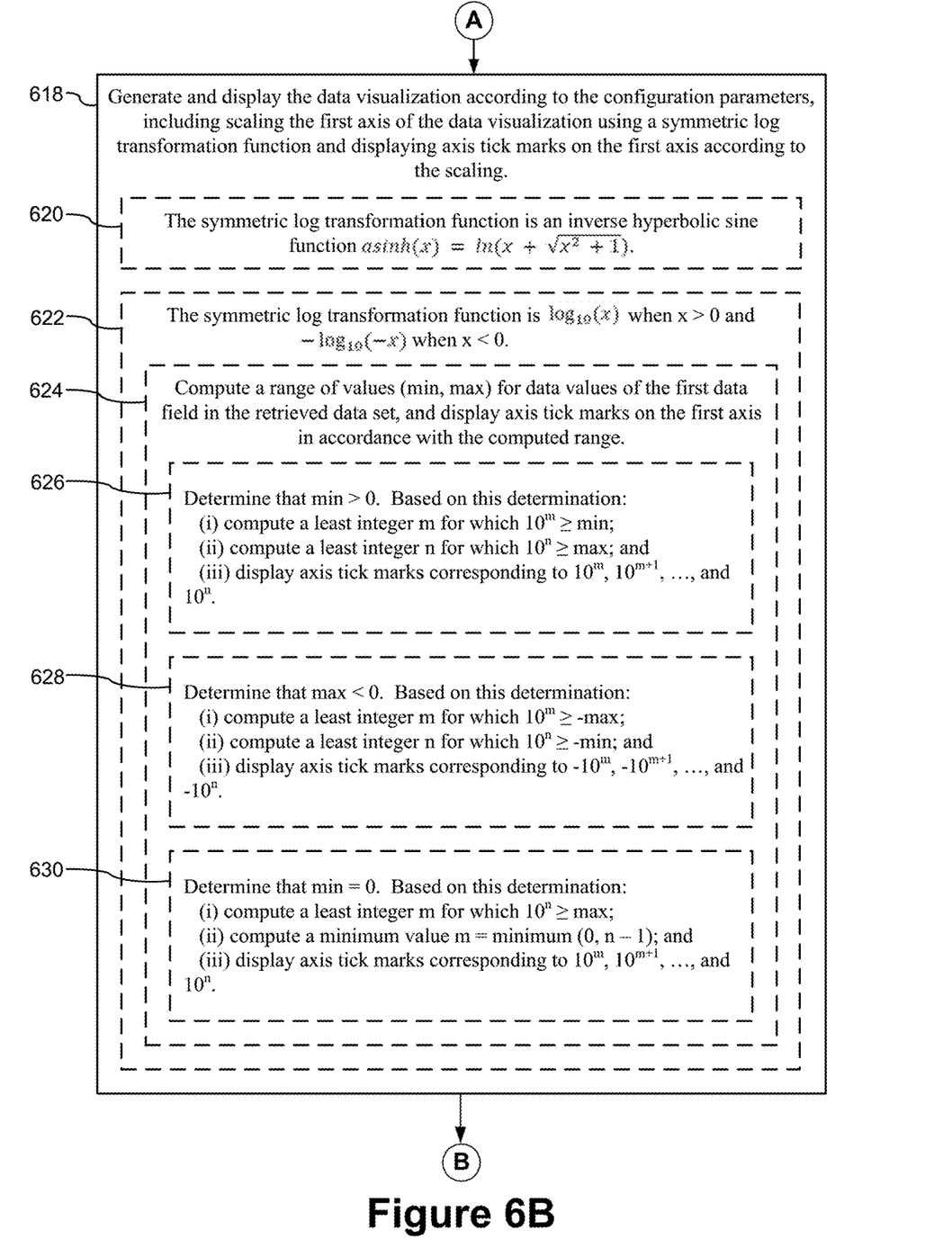
Figure 6C:
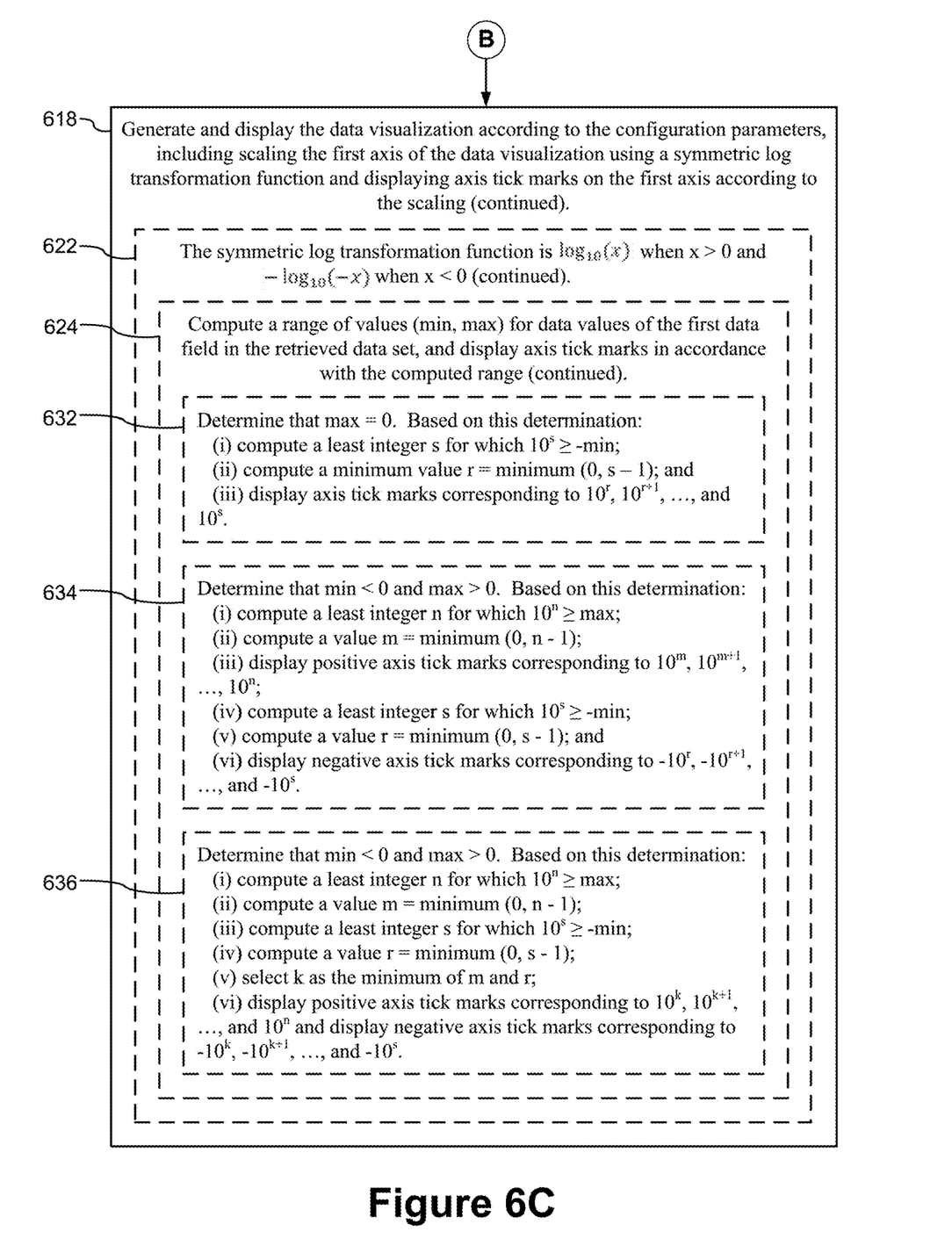

FIGS. 6A-6C provide a flowchart of a process 600 for that generates and displays (602) data in data visualizations. The process is performed (604) at a computer system (e.g., a personal device 102 or a data visualization server 106) having one or more processors and memory. The memory stores (606) one or more programs configured for execution by the one or more processors.

The process displays (608) a data visualization user interface 224. In the user interface 224, the user selects (610) a data set and a set of configuration parameters. In particular, the user selects (610) a first data field from the data set to define a first axis of a two-dimensional data visualization and selects a second data field from the data set to define a second axis of the two-dimensional data visualization.

In response to user selection of the first axis, the user interface 224 displays (612) an axis configuration window 500. In some implementations, the default behavior is to have no axis scaling for the first axis. In some implementations, the default behavior is automatic 508, in which case the default scaling is determined based on the distribution of data values for the first data field. In some instances, the user interacts with the axis configuration window to select (614) the symmetric log axis scaling option 506 for the first axis.

To display a data visualization, the process retrieves (616) the data set from a database in accordance with the set of configuration parameters. The process then generates (618) and displays (618) the data visualization according to the configuration parameters, including scaling the first axis of the data visualization using a symmetric log transformation function and displaying axis tick marks on the first axis according to the scaling. In some implementations, the symmetric log transformation function is (620) an inverse hyperbolic sine function a sin $h(x)=\ln(x+\sqrt{x^2+1})$. In some implementations, the symmetric log transformation function is (622) $\log_{10}(x)$ when x>0 and $-\log_{10}(-x)$ when x<0. In some implementations, generating and displaying the data visualization comprises (624) computing a range of values (min, max) for data values of the first data field in the retrieved data set, and displaying axis tick marks in accordance with the computed range.

In some instances, the process determines (626) that min>0. Based on this determination, the process (i) computes (626) a least integer m for which $10^m \geq$ min, computes (626) a least integer n for which $10^n \geq$ max, and displays (626) axis tick marks corresponding to $-10^m$, $10^{m+1}$, ..., and $-10^n$.

In some instances, the process determines (628) that max<0. Based on this determination, the process (i) computes (628) a least integer m for which $10^m \geq$ -max, (ii) computes a least integer n for which $10^n \geq$ min, and (iii) and displays (628) axis tick marks corresponding to $-10^m$, $-10^{m+1}$, ..., and $-10^n$.

In some instances, the process determines (630) that min=0. Based on this determination, the process (i) computes (630) a least integer n for which $10^n \geq$ max, (ii) computes (630) a value m=minimum (0, n-1), and (iii) displays (630) axis tick marks corresponding to $10^m$, $10^{m+1}$, ..., and $10^n$.

In some instances, the process determines (632) that max=0. Based on this determination, the process (i) computes (632) a least integer s for which $10^s \geq$ -min, (ii) computes (632) a value r=minimum (0, s-1), and (iii) displays (632) axis tick marks corresponding to $-10^r$, $-10^{r+1}$, ..., and $-10^s$.

In some instances, the process determines (634) that min<0 and max>0. Based on this determination, the process: (i) computes (634) a least integer n for which $10^n \geq$ max; (ii) computes a value m=minimum (0, n-1); (iii) displays (634) positive axis tick marks corresponding to $10^m$, $10^{m+1}$, ..., and $10^n$; (iv) computes (634) a least integer s for which $10^s \geq$ -min; (v) computes a value r=minimum (0, s-1); and (vi) displays negative axis tick marks corresponding to $-10^r$, $-10^{r+1}$, ..., and $-10^s$.

In some instances, the process determines (636) that min<0 and max>0. Based on this determination, the process: (i) computes (636) a least integer n for which $10^n \geq$ max; (ii) computes a value m=minimum (0, n-1); (iii) computes (636) a least integer s for which $10^s \geq$ -min; (iv) computes a value r=minimum (0, s-1); (v) selects (636) k as the minimum of m and r; (vi) displays (636) positive axis tick marks corresponding to $10^k$, $10^{k+1}$, ..., and $10^n$; and (vii) displays negative axis tick marks corresponding to $-10^k$, $-10^{k+1}$, ..., and $-10^s$.

Figures 7A, 7B:
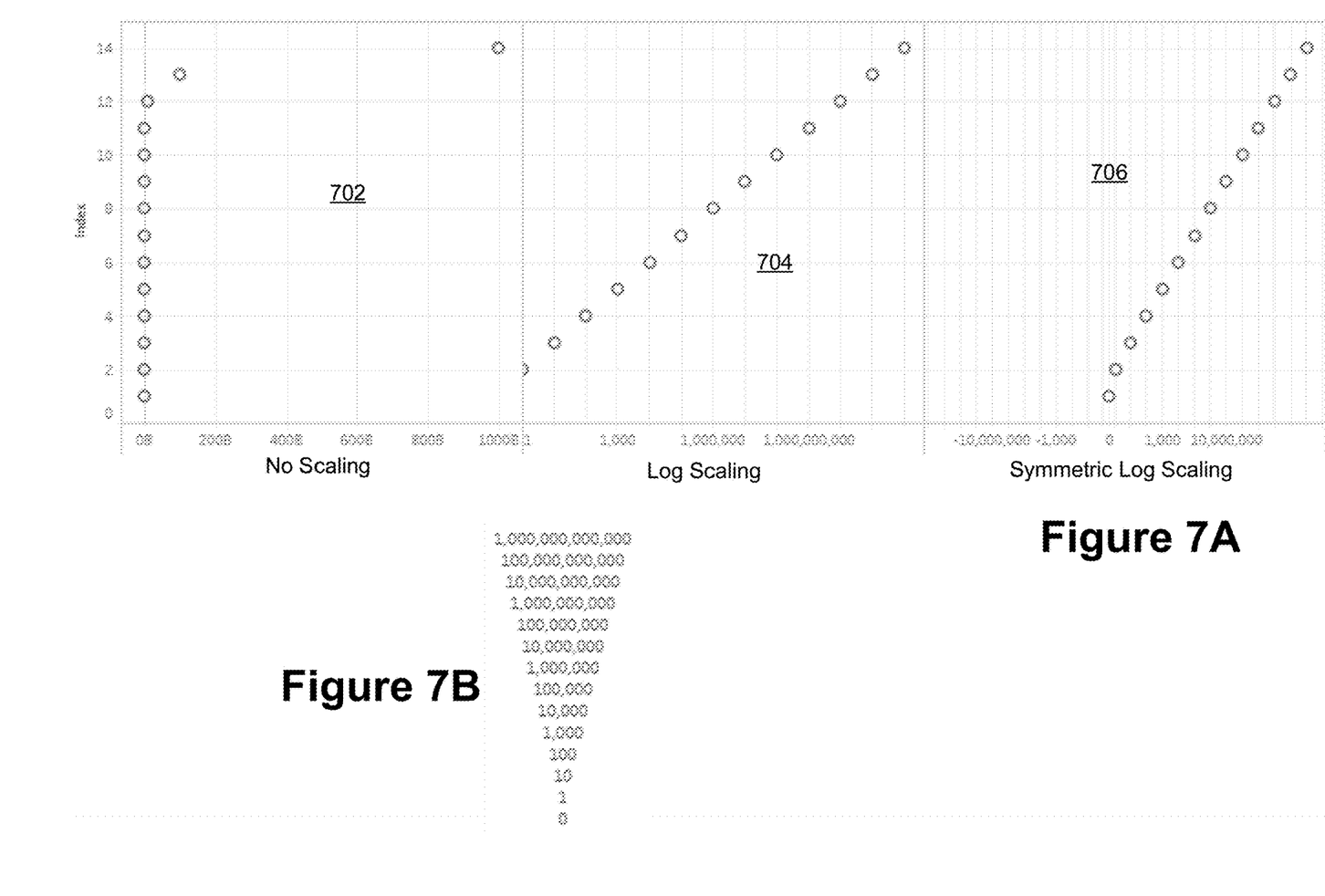
FIGS. 7A-7D provide comparisons between standard axes (no scaling), logarithmic axes, and symmetric log axes, in accordance with some implementations.

FIGS. 7A and 7B contrast axis scaling methods for an input set of data values that includes positive values and zero. The set of input data values is shown in FIG. 7B. FIG. 7A shows a first scatterplot 702 with no axis scaling. Without axis scaling, most of the data point make essentially a vertical line. The second scatterplot 704 shows logarithmic scaling. This scaling makes it easier to compare the data values, but the input data value 0 has been omitted because log(0) is undefined. The third scatterplot 706 uses symmetric log axis scaling. The symmetric log axis includes the point 0, but otherwise looks similar to the logarithmic chart 704.

Figures 7C, 7D:
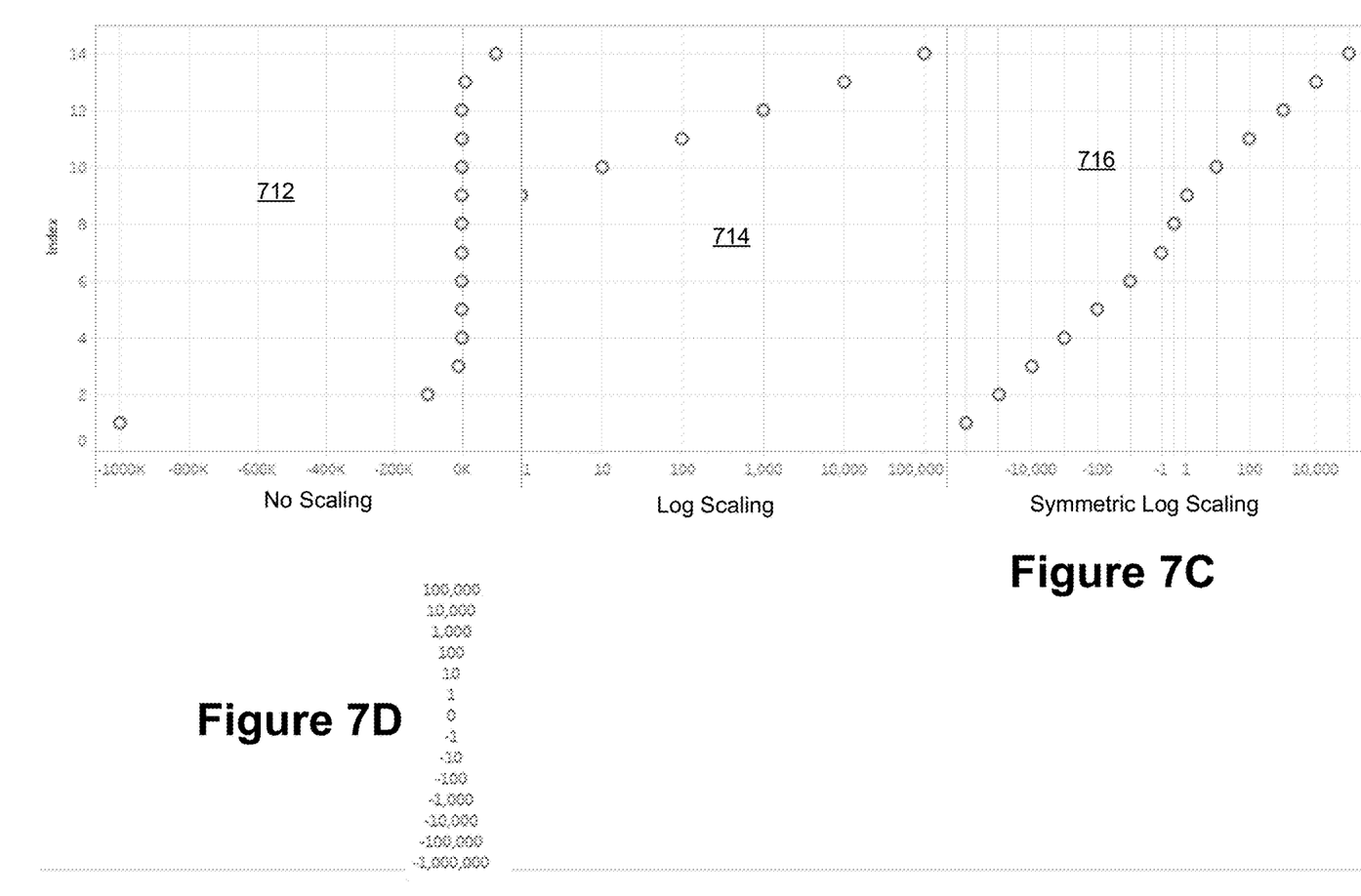

FIGS. 7C and 7D contrast axis scaling methods for an input set of data values that includes positive and negative values. The input data is shown in FIG. 7C. Without scaling, as shown in the first plot 712, all of the data points are visible, but most of the data points make a line up the middle. The second plot 714 uses logarithmic scaling, and does a good job plotting the data values that are positive. However, it omits all of the negative data values and omits zero. With symmetric log axis scaling, as shown in the third plot 716, all of the points are shown and the plot does a good job showing the relative magnitudes of all the data values The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:
1. A method of displaying data in data visualizations, comprising:
at a computer system having one or more processors and memory storing one or more programs configured for execution by the one or more processors:
displaying a data visualization user interface;
receiving user selection, in the user interface, of a data set and a set of configuration parameters, including selection of (i) a first data field from the data set to define a first axis of a two-dimensional data visualization and selection of (ii) a second data field from the data set to define a second axis of the data visualization;
in response to user selection of the first axis, displaying an axis configuration window in the user interface;
receiving, in the axis configuration window, user selection of a symmetric log axis scaling option for the first axis;
retrieving the data set from a database in accordance with the set of configuration parameters;
generating and displaying the data visualization according to the configuration parameters, including scaling the first axis of the data visualization using a symmetric log transformation function and displaying axis tick marks on the first axis according to the scaling.

2. The method of claim 1, wherein the symmetric log transformation function is an inverse hyperbolic sine function a sin h(x)=ln(x+$\sqrt{x^2+1}$).

3. The method of claim 1, wherein the symmetric log transformation function is $\log_{10}(x)$ when x>0 and $-\log_{10}(-x)$ when x<0.

4. The method of claim 3, wherein generating and displaying the data visualization comprises computing a range of values (min, max) for data values of the first data field in the retrieved data set, and displaying axis tick marks on the first axis in accordance with the computed range.

5. The method of claim 4, wherein generating and displaying the data visualization further comprises:
 determining that min>0;
 in response to the determination:
  computing a least integer m for which $10^m \geq $min;
  computing a least integer n for which $10^n \geq $max; and
  displaying axis tick marks corresponding to $10^m$, $10^{m+1}$, ..., and $10^n$.

6. The method of claim 4, wherein generating and displaying the data visualization further comprises:
 determining that max<0;
 in response to the determination:
  computing a least integer m for which $10^m \geq $-max;
  computing a least integer n for which $10^n \geq $-min; and
  displaying axis tick marks corresponding to $-10^m$, $-10^{m+1}$, ..., and $-10^n$.

7. The method of claim 4, wherein generating and displaying the data visualization further comprises:
 determining that min=0;
 in response to the determination:
  computing a least integer n for which $10^n \geq $max;
  computing a value m=minimum (0, n−1); and
  displaying axis tick marks corresponding to $10^m$, $10^{m+1}$, ..., and $10^n$.

8. The method of claim 4, wherein generating and displaying the data visualization further comprises:
 determining that max=0;
 in response to the determination:
  computing a least integer s for which $10^s \geq $-min;
  computing a value r=minimum (0, s−1); and
  displaying axis tick marks corresponding to $-10^r$, $-10^{r+1}$, ..., and $-10^s$.

9. The method of claim 4, wherein generating and displaying the data visualization further comprises:
 determining that min<0 and max>0;
 in response to the determination:
  computing a least integer n for which $10^n \geq $max;
  computing a value m=minimum (0, n−1);
  displaying positive axis tick marks corresponding to $10^m$, $10^{m+1}$, ..., and $10^n$;
  computing a least integer s for which $10^s \geq $-min;
  computing a value r=minimum (0, s−1); and
  displaying negative axis tick marks corresponding to $-10^r$, $-10^{r+1}$, ..., and $-10^s$.

10. The method of claim 4, wherein generating and displaying the data visualization further comprises:
 determining that min<0 and max>0;
 in response to the determination:
  computing a least integer n for which $10^n \geq $max;
  computing a value m=minimum (0, n−1);
  computing a least integer s for which $10^s \geq $-min;
  computing a value r=minimum (0, s−1);
  selecting k as the minimum of m and r;
  displaying positive axis tick marks corresponding to $10^k$, $10^{k+1}$, ..., and $10^n$; and
  displaying negative axis tick marks corresponding to $-10^k$, $-10^{k+1}$, ..., and $-10^s$.

11. A computing device having one or more processors and memory, wherein the memory stores one or more programs configured for execution by the one or more processors, the one or more programs comprising instructions for:
 displaying a data visualization user interface;
 receiving user selection, in the user interface, of a data set and a set of configuration parameters, including selection of (i) a first data field from the data set to define a first axis of a two-dimensional data visualization and selection of (ii) a second data field from the data set to define a second axis of the data visualization;
 in response to user selection of the first axis, displaying an axis configuration window in the user interface;
 receiving, in the axis configuration window, user selection of a symmetric log axis scaling option for the first axis;
 retrieving the data set from a database in accordance with the set of configuration parameters;
 generating and displaying the data visualization according to the configuration parameters, including scaling the first axis of the data visualization using a symmetric log transformation function and displaying axis tick marks on the first axis according to the scaling.

12. The computing device of claim 11, wherein the symmetric log transformation function is an inverse hyperbolic sine function a sin h(x)=ln(x+$\sqrt{x^2+1}$).

13. The computing device of claim 11, wherein the symmetric log transformation function is $\log_{10}(x)$ when x>0 and $-\log_{10}(-x)$ when x<0.

14. The computing device of claim 13, wherein generating and displaying the data visualization comprises computing a range of values (min, max) for data values of the first data field in the retrieved data set, and displaying axis tick marks on the first axis in accordance with the computed range.

15. The computing device of claim 14, wherein generating and displaying the data visualization further comprises:
 determining that min>0;
 in response to the determination:
  computing a least integer m for which $10^m \geq $min;
  computing a least integer n for which $10^n \geq $max; and
  displaying axis tick marks corresponding to $10^m$, $10^{m+1}$, ..., and $10^n$.

16. A non-transitory computer-readable storage medium storing one or more programs configured for execution by a computer system having one or more processors and memory, the one or more programs comprising instructions for:
 displaying a data visualization user interface;
 receiving user selection, in the user interface, of a data set and a set of configuration parameters, including selection of (i) a first data field from the data set to define a first axis of a two-dimensional data visualization and selection of (ii) a second data field from the data set to define a second axis of the data visualization;
 in response to user selection of the first axis, displaying an axis configuration window in the user interface;
 receiving, in the axis configuration window, user selection of a symmetric log axis scaling option for the first axis;
 retrieving the data set from a database in accordance with the set of configuration parameters;
 generating and displaying the data visualization according to the configuration parameters, including scaling the first axis of the data visualization using a symmetric log transformation function and displaying axis tick marks on the first axis according to the scaling.

17. The computer-readable storage medium of claim 16, wherein the symmetric log transformation function is an inverse hyperbolic sine function $a\sin h(x)=\ln(x+\sqrt{x^2+1})$.

18. The computer-readable storage medium of claim 16, wherein the symmetric log transformation function is $\log_{10}(x)$ when $x>0$ and $-\log_{10}(-x)$ when $x<0$.

19. The computer-readable storage medium of claim 18, wherein generating and displaying the data visualization comprises computing a range of values (min, max) for data values of the first data field in the retrieved data set, and displaying axis tick marks on the first axis in accordance with the computed range.

20. The computer-readable storage medium of claim 19, wherein generating and displaying the data visualization further comprises:
- determining that min=0;
- in response to the determination:
    - computing a least integer n for which $10^n \geq \max$;
    - computing a value m=minimum (0, n−1); and
    - displaying axis tick marks corresponding to $10^m$, $10^{m+1}$, ..., and $10^n$.

\* \* \* \* \*